United States Patent [19]

Chang et al.

[11] Patent Number: 5,169,614

[45] Date of Patent: * Dec. 8, 1992

[54] SYNTHESIS OF CRYSTALLINE SILICOALUMINOPHOSPHATE COMPOSITION

[75] Inventors: Clarence D. Chang, Princeton; John D. Lutner, Hamilton Square, both of N.J.

[73] Assignee: Mobil Oil Corporation, Fairfax, Va.

[*] Notice: The portion of the term of this patent subsequent to Nov. 14, 2006 has been disclaimed.

[21] Appl. No.: 179,344

[22] Filed: Apr. 8, 1988

[51] Int. Cl.$^5$ .............................................. C01B 33/34
[52] U.S. Cl. ..................................... 423/705; 502/77; 502/208; 502/214; 423/718
[58] Field of Search ............... 423/305, 306, 328, 329, 423/330; 502/214, 208, 77

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 3,801,704 | 4/1974 | Kobayashi et al. | 423/309 |
| 4,310,440 | 1/1982 | Wilson et al. | 252/435 |
| 4,385,994 | 5/1983 | Wilson et al. | 210/689 |
| 4,440,871 | 4/1984 | Lok et al. | 502/214 |
| 4,473,663 | 9/1984 | Patton et al. | 502/208 |
| 4,673,559 | 6/1987 | Derouane et al. | 423/306 |
| 4,683,217 | 7/1987 | Lok et al. | 502/214 |
| 4,684,617 | 8/1987 | Lok et al. | 502/214 |
| 4,686,092 | 8/1987 | Lok et al. | 423/306 |
| 4,686,093 | 8/1987 | Flanigen et al. | 423/306 |
| 4,704,478 | 11/1987 | Olson | 568/388 |

FOREIGN PATENT DOCUMENTS

| | | |
|---|---|---|
| 0043562 | 1/1982 | European Pat. Off. . |
| 0121232 | 10/1984 | European Pat. Off. . |
| 0121233 | 10/1984 | European Pat. Off. . |
| 0158348 | 10/1985 | European Pat. Off. . |
| 0158349 | 10/1985 | European Pat. Off. . |
| 0158350 | 10/1985 | European Pat. Off. . |
| 0158975 | 10/1985 | European Pat. Off. . |
| 0158976 | 10/1985 | European Pat. Off. . |
| 0158977 | 10/1985 | European Pat. Off. . |
| 0161488 | 11/1985 | European Pat. Off. . |
| 0161489 | 11/1985 | European Pat. Off. . |
| 0161490 | 11/1985 | European Pat. Off. . |
| 0161491 | 11/1985 | European Pat. Off. . |

OTHER PUBLICATIONS

F. d'Yvoire, Memoir Presented to the Chemical Society, No. 392, "Study of Aluminum Phosphate and Trivalent Iron", Jul. 6, 1961, pp. 1762-1776.

Primary Examiner—R. Bruce Breneman
Attorney, Agent, or Firm—Alexander J. McKillop; Charles J. Speciale; Dennis P. Santini

[57] ABSTRACT

This invention relates to a new crystalline silicoaluminophosphate composition, to a new and useful improvement in synthesizing said crystalline composition and to use of said crystalline composition prepared in accordance herewith as a catalyst component for organic compound, e.g. hydrocarbon compound, conversion.

17 Claims, 2 Drawing Sheets

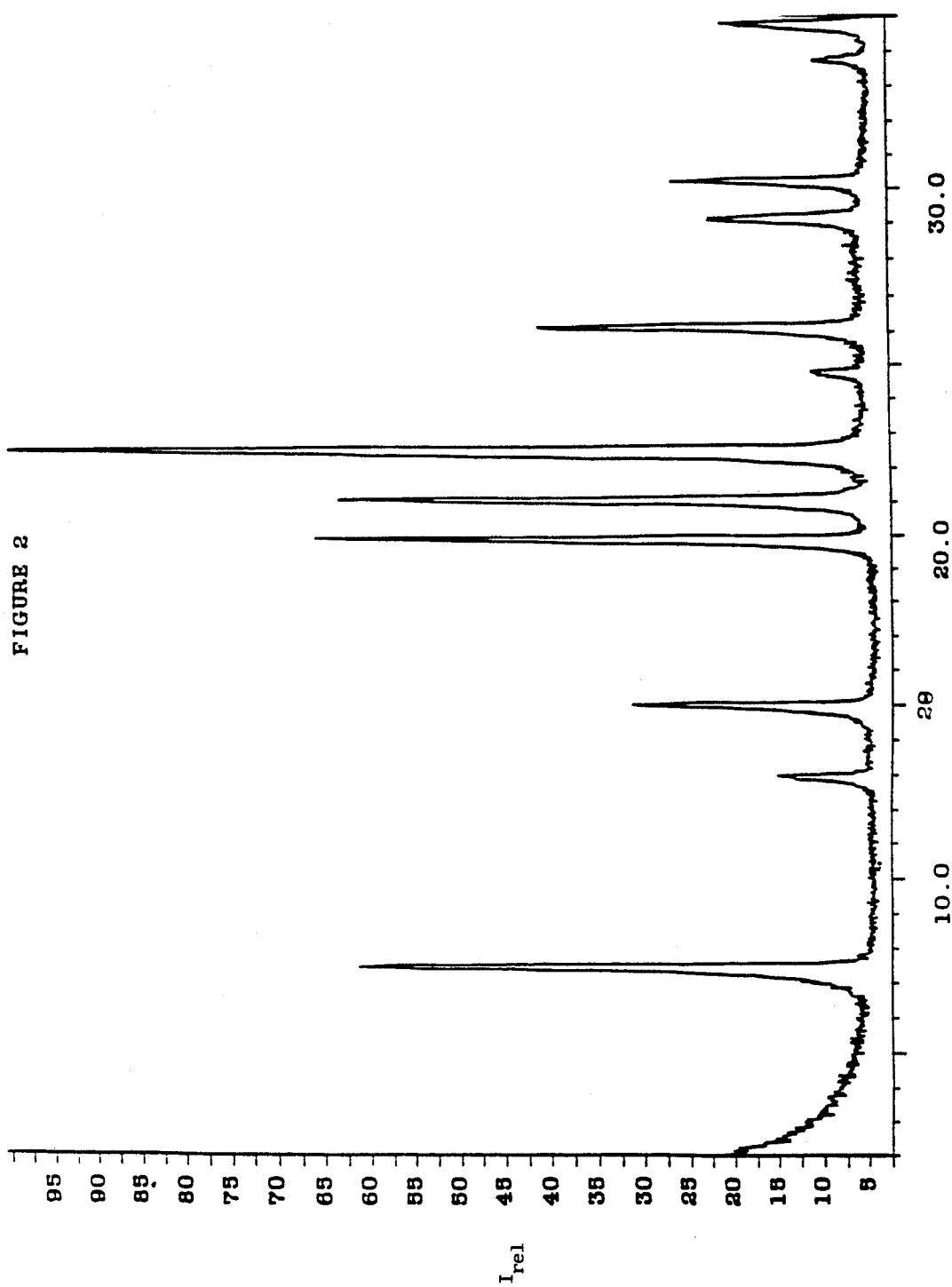

SYNTHESIS OF CRYSTALLINE SILICOALUMINOPHOSPHATE COMPOSITION

CROSS-REFERENCE TO RELATED APPLICATIONS

This application is related by subject matter to U.S. application Ser. No. 136,083, filed Dec. 21, 1987 now U.S. Pat. No. 4,880,611. Application Ser. No. 136,083 is a continuation-in-part of copending U.S. application Ser. No. 117,858, filed Nov. 6, 1987, now abandoned, which is a continuation of application Ser. No. 878,754, filed Jun. 26, 1986, now U.S. Pat. No. 4,891,197, which is a continuation-in-part of copending U.S. application Ser. No. 642,925, filed Aug. 21, 1984, now abandoned, which is, in turn, a continuation-in-part of U.S. application Ser. No. 562,673, filed Dec. 19, 1983, now abandoned. Application Ser. No. 685,171, filed Dec. 21, 1984, now U.S. Pat. No. 4,673,559, was also a continuation-in-part of U.S. application Ser. No. 562,673. Application Ser. No. 642,925 is a continuation-in-part of U.S. application Ser. No. 615,391, filed May 25, 1984, now abandoned. Application Ser. No. 878,754 is also a continuation-in-part of U.S. application Ser. No. 685,186, filed Dec. 21, 1984, now U.S. Pat. No. 4,623,527. Application Ser. No. 685,186 is, in turn, a continuation-in-part of U.S. application Ser. No. 562,909, filed Dec. 19, 1983, now abandoned.

This application is also related by subject matter to European Patent Application Number 84308812.1, filed Dec. 17, 1984, now Published European Patent Application Number 147,991; and European Patent Application Number 84308805.5, filed Dec. 17, 1984, now Published European Patent Application Number 146,384.

The entire disclosures of the above-mentioned U.S. and European Patent Applications are expressly incorporated herein by reference.

This application is also related by subject matter to U.S. Applications Ser. Nos. 179,173; 179,175; 179,338; 179,341; and 179,343, filed on even date herewith.

BACKGROUND OF THE INVENTION

1. Field of the Invention

This invention relates to a new and useful improvement in synthesizing a crystalline silicoaluminophosphate composition from a reaction mixture containing a specific new directing agent, hereinafter more particularly defined, the new crystalline composition synthesized, and to use of the crystalline composition synthesized in accordance herewith as a catalyst component for organic compound, e.g. hydrocarbon compound, conversion.

More particularly, this invention relates to an improved method for preparing a crystalline silicoaluminophosphate composition whereby synthesis is facilitated and reproducible and the product comprises crystals having large pore windows measuring greater than about 10 Angstroms in diameter, such as, for example, greater than about 12 Angstroms in diameter.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the Joint Commission for Powder Diffraction Standards (JCPDS), card number 15-274, and has an X-ray diffraction pattern exhibiting lines of Tables 1A, 1B and 1C, hereinafter presented. Once heated at about 110° C., however, the d'Yvoire material becomes amorphous.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1);

4,647,442 (MCM-2); 4,664,897 (MCM-4); 4,639,357 (MCM-5) and 4,632,811 (MCM-3).

A method for synthesizing crystalline metalloaluminophosphate is shown in U.S. Pat. No. 4,713,227 and an antimonophosphoaluminate is taught in U.S. Pat. No. 4,619,818. U.S. Pat. No. 4,567,029 teaches metalloaluminophosphates, and titaniumaluminophosphate is taught in U.S. Pat. No. 4,500,651.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al (Zeolites, 1983, Vol. 3, October, 282–291) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of the presently required directing agent compound for synthesis of the silicoaluminophosphate composition of this invention. ZSM-5 and AlPO$_4$-5 are taught by Lok et al to be directed by tetrapropylammonium hydroxide from appropriate reaction mixtures. Choline compounds are taught to direct synthesis of ZSM-34, ZSM-38, ZSM-43, AlPO$_4$-5 and AlPO$_4$-7.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of a novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for syntheses of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5, having a structure different from the presently synthesized crystal, from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a various assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R) N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 or 6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

Applicants know of no prior art for preparing the crystalline silicoaluminophosphate composition utilizing as a directing agent that required of the present invention.

SUMMARY OF THE INVENTION

An improved, economical and reproducible hydrothermal synthesis method for preparing crystalline silicoaluminophosphate exhibiting valuable properties is provided. The method comprises forming a reaction mixture hydrogel containing sources of silicon oxide, aluminum oxide, phosphorus oxide, directing agent, and water and having a composition, in terms of mole ratios, within the following ranges:

|  | Broad | Preferrred | Most Preferred |
| --- | --- | --- | --- |
| $SiO_2/Al_2O_3$ | 0.01 to 0.5 | 0.01 to 0.2 | 0.01 to 0.1 |
| $P_2O_5/Al_2O_3$ | 0.5 to 1.25 | 0.8 to 1.2 | 0.9 to 1.1 |
| $H_2O/Al_2O_3$ | 10 to 100 | 20 to 80 | 30 to 60 |
| $DA/Al_2O_3$ | 0.2 to 0.8 | 0.3 to 0.7 | 0.4 to 0.6 | where DA is the directing agent, hereinafter more particularly defined, and maintaining the mixture until crystals of the desired crystalline composition are formed.

Reaction conditions required of the instant invention are critical and consist of heating the foregoing reaction mixture to a temperature of from about 100° C. to less than about 150° C. for a period of time of from about 1 hour to less than about 80 hours. A more preferred temperature range is from about 130° C. to about 150° C. with the amount of time at a temperature in such range being from about 10 hours to about 30 hours. If the temperature is higher than about 150° C. and the time exceeds about 50 hours, the product composition will be diminished of desired large pore crystals characterized by the X-ray diffraction patterns of Tables 1A, 1B and 1C, hereinafter presented. Also critical of this synthesis procedure is the reaction mixture ratio of $P_2O_5/Al_2O_3$. When the ratio $P_2O_5/Al_2O_3$ is greater than about 1.25, especially when the reaction temperature is greater than about 150° C., product composition will be diminished of desired large pore crystals characterized by the X-ray diffraction patterns of Tables 1A, 1B and 1C, hereinafter presented.

The solid product composition comprising the desired silicoaluminophosphate is recovered from the reaction medium, as by cooling the whole to room temperature, filtering and water washing.

BRIEF DESCRIPTION OF THE DRAWINGS

FIG. 2 shows the X-ray powder diffraction pattern of the product of Example 2.

EMBODIMENTS

Figure 1:
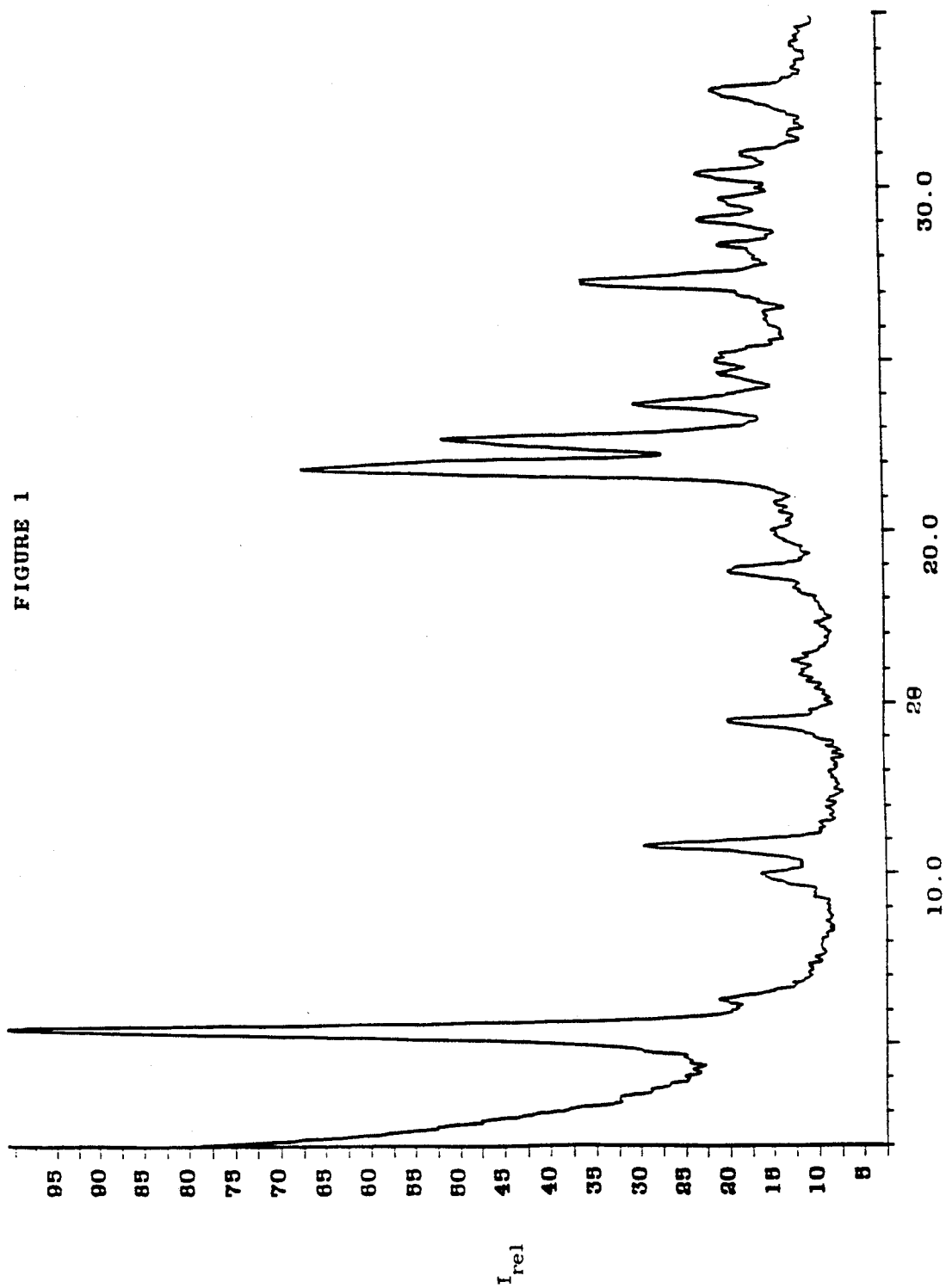
FIG. 1 shows the X-ray powder diffraction pattern of the product of Example 1.

The crystalline silicoaluminophosphate composition synthesized in accordance with the present method exhibits utility as a catalyst component for certain chemical reactions of interest, including cracking, hydrocracking, disproportionation, alkylation, isomerization, oxidation and converting oxygenates, e.g. methanol, to hydrocarbons.

The particular effectiveness of the presently required directing agent, when compared with other directing agents, such as those identified above, is believed due to its ability to function as a template in the above reaction mixture in the nucleation and growth of the desired silicoaluminophosphate crystals with the limitations above discussed. This directing agent is the compound represented by the formula:

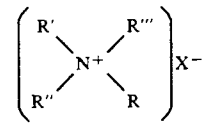

wherein X is an anion such as one selected from the group consisting of hydroxide and halide (e.g. chloride or bromide), and R, R', R" and R'" are the same or different and are selected from the group consisting of —CH$_2$X and —CH$_2$CH$_2$X. Non-limiting examples of these compounds include tetrakis(2-hydroxyethyl)ammonium hydroxide, tetrakis(2-chloroethyl)ammonium chloride and tetrakis(hydroxymethyl)ammonium bromide.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The reaction mixture composition for the synthesis of synthetic crystalline silicoaluminophosphate hereby can be prepared utilizing materials which can supply the appropriate oxide. The useful sources of aluminum oxide include, as non-limiting examples, any known form of aluminum oxide or hydroxide, organic or inorganic salt or compound, e.g. alumina and aluminates. Such sources of aluminum oxide include pseudo-boehmite and aluminum tetraalkoxide. The useful sources of phosphorus oxide include, as non-limiting examples, any known form of phosphorus acids or phosphorus oxides, phosphates and phosphites, and organic derivatives of phosphorus. The useful sources of silicon oxide include, as non-limiting examples, any known form of silicic acid or silicon dioxide, alkoxy- or other compounds of silicon, including silica gel and silica hydrosol. Such sources of silicon oxide include Ultrasil or a tetraalkoxysilane.

It will be understood that each oxide component utilized in the reaction mixture for preparing the present crystalline composition can be supplied by one or more essential reactants and they can be mixed together in any order. For example, any oxide can be supplied by an aqueous solution. The reaction mixture can be prepared either batchwise or continuously. Crystal size and crystallization time for the product composition comprising the desired silicoaluminophosphate will vary with the exact nature of the reaction mixture employed within the above-described limitations.

The present product composition as synthesized hereby can be identified, in terms of mole ratios of oxides as follows:

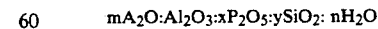

$mA_2O:Al_2O_3:xP_2O_5:ySiO_2: nH_2O$ wherein A represents the cation portion of the directing agent compound used in synthesis of the product composition, m is a number of from 0 (e.g. about 0.1) to about 0.8, x is a number of from about 0.5 to about 1.5, y is a number of from about 0.01 to about 0.5, and n is a number of from 0 (e.g. less than about 10) to about 100. Any organic material resulting from directing agent used in the synthesis procedure may be removed upon calcination.

The crystalline composition resulting from the present method comprises crystals having a framework topology which exhibit, even after being heated at 110° C. or higher, a characteristic X-ray diffraction pattern having the following characteristic values:

TABLE 1A

| Interplanar d-Spacings (A) | Relative Intensity |
| --- | --- |
| 16.4 ± 0.2 | vs |
| 8.2 ± 0.1 | w |
| 4.74 ± 0.05 | w | and more specifically the following characteristic values:

TABLE 1B

| Interplanar d-Spacings (A) | Relative Intensity |
| --- | --- |
| 16.4 ± 0.2 | vs |
| 8.2 ± 0.1 | w |
| { 6.21 / 6.17 } ± 0.05 | w |
| 5.48 ± 0.05 | w |
| 4.74 ± 0.05 | w | and even more specifically the following characteristic values:

TABLE 1C

| Interplanar d-Spacings (A) | Relative Intensity |
| --- | --- |
| 16.4 ± 0.2 | vs |
| 8.2 ± 0.1 | w |
| { 6.21 / 6.17 } ± 0.05 | w |
| 5.48 ± 0.05 | w |
| 4.74 ± 0.05 | w |
| 4.10 ± 0.04 | w |
| 4.05 ± 0.04 | w |
| { 3.96 / 3.94 } ± 0.04 | w |
| 3.76 ± 0.03 | w |
| 3.28 ± 0.03 | w |

The X-ray diffraction lines in Tables 1A, 1B and 1C identify a crystal framework topology in the composition exhibiting large pore windows of 18-membered ring size. The pores are at least about 10 Angstroms in diameter, such as for example at least about 12 Angstroms, e.g. 12-13 Angstroms, in diameter. These lines distinguish this topology from other crystalline aluminosilicate, aluminophosphate and silicoaluminophosphate structures. It is noted that the X-ray pattern of the present composition is void of a d-spacing value at 13.6-13.3 Angstroms with any significant intensity relative the strongest d-spacing value. If a d-spacing value in this range appears in a sample of the present composition, it is due to impurity and will have a weak relative intensity. An 18-membered ring aluminophosphate structure was published by M. Davis, D. Saldarriaga, C. Montes and J. Garces at the "Innovation in Zeolite Materials Science" meeting in Nieuwpoort, Belgium, Sep. 13-17, 1987. The large pore "AlPO$_4$-8" of U.S. Pat. No. 4,310,440 has a d-spacing value at 13.6-13.3 Angstroms with a medium-very strong relative intensity as reported in the patent. The d'Yvoire aluminumphosphate identified above, i.e. JCPDS card number 15-274, is not crystalline after being heated at about 110° C.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, $I/I_o$, where $I_o$ is one-hundredth of the intensity of the strongest line, including subtraction of the background, were derived. The relative intensities are given in terms of the symbols vs=very strong (75-100%), s=strong (50-74%), m=medium (25-49%) and w=weak (0-24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the composition component ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

While the improved crystalline composition of the present invention may be used as a catalyst component in a wide variety of organic compound, e.g. hydrocarbon compound, conversion reactions, it is notably useful in the processes of cracking, hydrocracking, isomerization and reforming. Other conversion processes for which the present composition may be utilized as a catalyst component include, for example, dewaxing.

The crystalline silicoaluminophosphate composition prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the crystalline composition such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

The present composition, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized composition can be prepared by heating same at a temperature of from about 200° C. to about 550° C. for from 1 hour to about 48 hours.

As above mentioned, synthetic silicoaluminophosphate prepared in accordance herewith can have original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths and metals from Groups IIA, IIIA, IVA, IB, IIB, IIIB, IVB, VIB AND VIII of the Periodic Table of Elements, especially Mn, Ca, Mg, Zn, Cd, Pd, Ni, Cu, Ti, Al, Sn, Fe and Co.

Typical ion exchange technique would be to contact the synthetic material with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the silicoaluminophosphate composition is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline material prepared by the instant invention may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst comprising the present material is molded, such as by extrusion, the material can be extruded before drying or dried or partially dried and then extruded.

In the case of many catalysts, it may be desired to incorporate the hereby prepared silicoaluminophosphate with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the present silicoaluminophosphate, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized silicoaluminophosphate include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalyst comprising the composition of this invention containing a hydrogenation component, reforming stocks can be reformed employing a temperature between 450° C. and 550° C. The pressure can be between 50 and 500 psig, but is preferably between 100 and 300 psig. The liquid hourly space velocity is generally between 0.1 and 10 hr$^{-1}$, preferably between 1 and 4 hr$^{-1}$ and the hydrogen to hydrocarbon mole ratio is generally between 1 and 10, preferably between 3 and 5.

A catalyst comprising the present composition can also be used for hydroisomerization of normal paraffins, when provided with a hydrogenation component, e.g. platinum. Hydroisomerization is carried out at a temperature between 250° C. to 450° C., preferably 300° C. to 425° C., with a liquid hourly space velocity between 0.1 and 10 hr$^{-1}$, preferably between 0.5 and 4 hr$^{-1}$, employing hydrogen such that the hydrogen to hydrocarbon mole ratio is between 1 and 10. Additionally, the catalyst can be used for olefin or aromatics isomerization employing temperatures between 0° C. and 550° C.

A catalyst comprising the silicoaluminophosphate of this invention can also be used for reducing the pour point of gas oils. This process is carried out at a liquid hourly space velocity between about 0.1 and about 5 hr$^{-1}$ and a temperature between about 300° C. and about 425° C.

Other reactions which can be accomplished employing a catalyst comprising the composition of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented.

EXAMPLE 1

A mixture containing 56.4 g of 85% orthophosphoric acid (H3PO4) in 77.5 g water was mixed with 35.5 g aluminum oxide source (e.g. pseudo-boehmite) and 0.6 g silicon oxide source (e.g. HiSil). The mixture was heated to 80° C. with stirring for 1 hour. To this mixture was added 52.75 g tetrakis(2-hydroxyethyl)ammonium hydroxide (DA) in 75 g water, giving a final reaction mixture composed as follows:

SiO2/Al2O3 = 0.04
P2O5/Al2O3 = 1
H2O/Al2O3 = 41
DA/Al2O3 = 0.5

The reaction mixture was placed in a 300 cc autoclave. Crystallization in the autoclave was at 142° C. under 300 psig nitrogen for 17 hours. The solid product was filtered, washed and dried. Washing was accomplished by extraction with water in a Soxhlet apparatus. The product was calcined at 530° C. in air for 10 hours.

The calcined product was analyzed by X-ray powder diffraction and found to be crystalline and to show the pattern of Table 2 and FIG. 1.

TABLE 2

| Interplanar d-Spacings (A) | Observed 2 × Theta | Relative Intensities (I/I$_o$) |
|---|---|---|
| 16.68787 } | 5.296 | 58.5 |
| 16.26226 } | 5.434 | 100.0 |
| 8.89212 | 9.947 | 7.3 |
| 8.17058 | 10.828 | 20.6 |
| 6.13784 | 14.431 | 11.1 |
| 5.46353 | 16.223 | 1.8 |
| 4.73902 } | 18.724 | 9.0 |
| 4.70722 } | 18.852 | 8.4 |
| 4.07994 } | 21.783 | 67.3 |
| 4.07134 } | 21.830 | 61.1 |
| 4.05055 | 21.943 | 53.7 |
| 3.96029 } | 22.450 | 32.3 |
| 3.94729 } | 22.525 | 38.9 |
| 3.92603 | 22.649 | 46.9 |
| 3.75873 | 23.671 | 16.2 |
| 3.62657 | 24.547 | 3.4 |
| 3.33667 | 26.717 | 2.3 |
| 3.31352 | 26.907 | 2.4 |
| 3.27994 | 27.188 | 21.1 |
| 3.26921 | 27.279 | 23.0 |
| 3.15504 | 28.286 | 3.8 |
| 3.07718 | 29.018 | 8.4 |
| 3.02872 | 29.492 | 2.4 |
| 3.01346 | 29.645 | 1.2 |
| 2.98113 | 29.974 | 0.4 |
| 2.95165 | 30.280 | 6.5 |
| 2.94100 | 30.393 | 9.0 |
| 2.82514 | 31.671 | 0.0 |
| 2.75903 | 32.451 | 2.0 |

Chemical analysis of the extracted Example 1 product indicated the following composition:
Al—22.09 wt. %
P—18.84 wt. %
Si—0.29 wt. %
Na—0.04 wt. %

EXAMPLE 2

A mixture containing 55.8 g of 85% orthophosphoric acid (H3PO4) in 77.5 g water was mixed with 35.5 g aluminum oxide source (e.g. pseudo-boehmite) and 1.0 g silicon oxide source (e.g. HiSil). The mixture was heated to 80° C. with stirring for 1 hour. To this mixture was added 52.75 g tetrakis(2-hydroxyethyl)ammonium hydroxide (DA) in 75 g water, giving a final reaction mixture composed as follows:

SiO2/Al2O3 = 0.068
P2O5/Al2O3 = 1
H2O/Al2O3 = 41
DA/Al2O3 = 0.5

The reaction mixture was placed in a 300 cc autoclave. Crystallization in the autoclave was at 151° C. under 300 psig nitrogen for 20 hours. The solid product was filtered, washed with water and dried at 110° C. for 17 hours.

The product was analyzed by X-ray powder diffraction and found to be crystalline and to show the pattern of Table 3 and FIG. 2.

TABLE 3

| Interplanar d-Spacings (A) | Observed 2 × Theta | Relative Intensities (I/I$_o$) |
|---|---|---|
| 11.87357 | 7.445 | 56.6 |
| 6.84887 | 12.926 | 9.5 |
| 5.92402 | 14.955 | 26.1 |
| 4.47513 | 19.839 | 60.8 |
| 4.22879 | 21.008 | 57.8 |
| 3.95662 | 22.471 | 100.0 |
| 3.59569 | 24.761 | 4.9 |
| 3.41744 | 26.074 | 35.1 |
| 3.25865 | 27.369 | 0.5 |
| 3.07050 | 29.082 | 15.8 |
| 2.95952 | 30.198 | 19.3 |
| 2.65784 | 33.722 | 5.0 |
| 2.58301 | 34.730 | 15.4 |

The product of Example 2, crystallized from the indicated reaction mixture at 151° C. for 20 hours was primarily SAPO-5, void of any significant amount of the large pore silicoaluminophosphate crystals of the present synthesis invention.

What is claimed is:

1. A method for synthesizing a silicoaluminophosphate composition comprising crystals having a framework topology after heating at 110° C. or higher giving an X-ray diffraction pattern with interplanar d-spacings at 16.4±0.2, 8.2±0.1 and 4.74±0.05 Angstroms, which comprises (i) preparing a mixture capable of forming said composition, said mixture comprising sources of an oxide of silicon, an oxide of aluminum, an oxide of phosphorus, water and a directing agent (DA), and having a composition, in terms of mole ratios, within the following ranges:

SiO2/Al2O3—0.01 to 0.5
P2O5/Al2O3—0.5 to 1.25
H2O/Al2O3—10 to 100
DA/Al2O3—0.2 to 0.8 wherein DA is a compound of the formula:

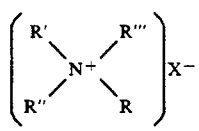

wherein R, R', R" and R''' are the same or different and are selected from the group consisting of —CH2X and —CH2CH2X, and X is hydroxide or halide, (ii) maintaining said mixture under sufficient conditions including a temperature of from about 100° C. to less than about 150° C. for a period of time of less than about 80 hours and (iii) recovering said crystalline silicoaluminophosphate composition from step (ii) containing the ion

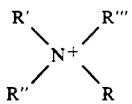

2. The method of claim 1 wherein said mixture has the following composition ranges:
$SiO_2/Al_2O_3$—0.01 to 0.2
$P_2O_5/Al_2O_3$—0.8 to 1.2
$H_2O/Al_2O_3$—20 to 80
$DA/Al_2O_3$—0.3 to 0.7.

3. The method of claim 1 wherein said crystals give an X-ray diffraction pattern with interplanar d-spacings at 16.4±0.2, 8.2±0.1, 6.21±0.05, 6.17±0.05, 5.48±0.05, and 4.74±0.05 Angstroms.

4. The method of claim 1 wherein said crystals give an X-ray diffraction pattern with interplanar d-spacings at 16.4±0.2, 8.2±0.1, 6.21±0.05, 6.17±0.05, 5.48±0.05, 4.74±0.05, 4.10±0.04, 4.05±0.04, 3.96±0.04, 3.94±0.04, 3.76±0.03, and 3.28±0.03 Angstroms.

5. The method of claim 1 wherein DA is a tetrakis(2-hydroxyethyl) ammonium compound.

6. The method of claim 2 wherein DA is a tetrakis(2-hydroxyethyl) ammonium compound.

7. The method of claim 1 wherein said mixture further comprises seed crystals in sufficient amount to enhance synthesis of said crystalline silicoaluminophosphate.

8. The method of claim 2 wherein said crystals give an X-ray diffraction pattern with interplanar d-spacings at 16.4±0.2, 8.2±0.1, 6.21±0.05, 6.17±0.05, 5.48±0.05, and 4.74±0.05 Angstroms.

9. The method of claim 2 wherein said crystals give an X-ray diffraction pattern with interplanar d-spacings at 16.4±0.2, 8.2±0.1, 6.21±0.05, 6.17±0.05, 5.48±0.05, 4.74±0.05, 4.10±0.04, 4.05±0.04, 3.96±0.04, 3.94±0.04, 3.76±0.03, and 3.28±0.03 Angstroms.

10. The method of claim 1 comprising replacing cations of the crystalline silicoaluminophosphate composition recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

11. The method of claim 2 comprising replacing cations of the crystalline silicoaluminophosphate composition recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

12. The method of claim 10 wherein said replacing cation is hydrogen or a hydrogen precursor.

13. The method of claim 11 wherein said replacing cation is hydrogen or a hydrogen precursor.

14. The recovered crystalline silicoaluminophosphate composition of claim 1.

15. The recovered crystalline silicoaluminophosphate composition of claim 2.

16. A catalyst composition comprising the crystalline silicoaluminophosphate of claim 14 and a catalytically active or inactive component.

17. A catalyst composition comprising the crystalline silicoaluminophosphate of claim 15 and a catalytically active or inactive component.

* * * * *